United States Patent [19]
Buck et al.

[11] Patent Number: 5,739,472
[45] Date of Patent: Apr. 14, 1998

[54] FLEXIBLE ARMOR CABLE ASSEMBLY

[75] Inventors: Arthur Glen Buck, Sherwood; Doris Arlene Beck, Beaverton; Sokha Chy, Tualtin; Larry L. Davis, Milwaukie; Malai Lim Hongthong, Portland; Jason Edward Muller, Tigard, all of Oreg.

[73] Assignee: The Whitaker Corporation, Wilmington, Del.

[21] Appl. No.: 595,693

[22] Filed: Feb. 2, 1996

Related U.S. Application Data

[60] Provisional application No. 60/004,805, Sep. 29, 1995, abandoned.

[51] Int. Cl.⁶ .................................................. H01B 7/18
[52] U.S. Cl. ............................................ 174/107; 174/74 R
[58] Field of Search ................................. 174/107, 102 R, 174/102 D, 106 R, 109, 74 R, 59, 61, 64

[56] References Cited

U.S. PATENT DOCUMENTS

| | | |
|---|---|---|
| 1,781,574 | 11/1930 | Frederickson . |
| 2,100,824 | 11/1937 | Wayman .................... 247/18 X |
| 2,189,091 | 2/1940 | Unterbusch ................ 174/29 X |
| 2,623,093 | 12/1952 | Smith ........................ 174/106 R |
| 2,691,059 | 10/1954 | Umina ........................ 174/74 R |
| 2,798,744 | 7/1957 | Budnick et al. ............. 285/149 X |
| 2,852,597 | 9/1958 | Raydt et al. ................ 174/107 |
| 3,717,718 | 2/1973 | Schmidtchen ............. 174/106 D X |
| 3,932,872 | 1/1976 | Zenel et al. ................ 343/788 |
| 4,268,714 | 5/1981 | Mori .......................... 174/108 |
| 4,398,058 | 8/1983 | Gerth et al. ................ 174/106 D |
| 4,761,519 | 8/1988 | Olson et al. ................ 174/107 |
| 4,896,000 | 1/1990 | Procter et al. .............. 174/74 R |
| 5,004,438 | 4/1991 | Cabourne ................... 439/825 |
| 5,053,582 | 10/1991 | Terakawa et al. .......... 174/36 |
| 5,156,155 | 10/1992 | King ........................ 128/662.06 X |
| 5,247,917 | 9/1993 | Hummel et al. ............ 123/364 |
| 5,281,757 | 1/1994 | Marin et al. ................ 174/23 R |
| 5,350,885 | 9/1994 | Falciglia et al. ........... 174/112 |
| 5,414,215 | 5/1995 | Dunand et al. ............. 174/113 R |

FOREIGN PATENT DOCUMENTS

| | | |
|---|---|---|
| 0 276 974 | 8/1988 | European Pat. Off. . |
| 0 0669 687 | 8/1995 | European Pat. Off. . |
| 2 080 010 | 1/1982 | United Kingdom . |

OTHER PUBLICATIONS

PCT International Search Report. International Application No. PCT/US96/15295. International Filing Date Sep. 25, 1996.

*Primary Examiner*—Kristine L. Kincaid
*Assistant Examiner*—Chau N. Nguyen
*Attorney, Agent, or Firm*—Gerald K. Kita

[57] ABSTRACT

A flexible cable assembly (1) is constructed with flexible and hollow armor (2) lying limply within an air gap (3) in a flexible outer jacket (4), multiple coaxial cables (5) lying limply within an air gap (6) in the armor (2), a coupling (7) for connection to a medical instrument (9), the coupling (7) being secured to an end of the armor (2) and an end of the jacket (4), with the cables (5) extending through the coupling (7) for connection to the medical instrument (9).

9 Claims, 4 Drawing Sheets

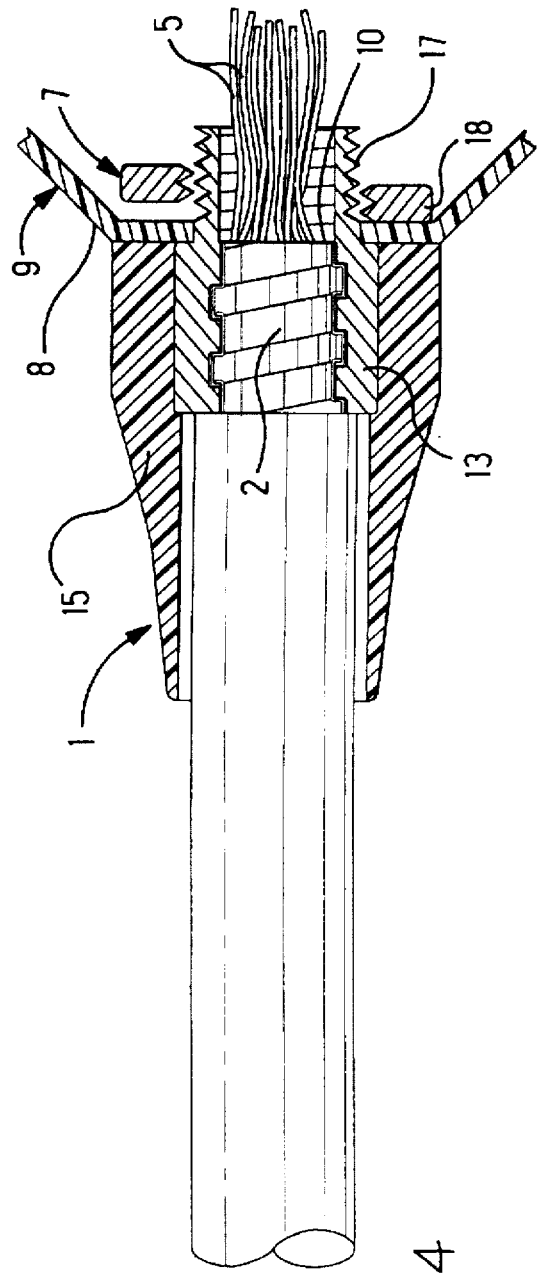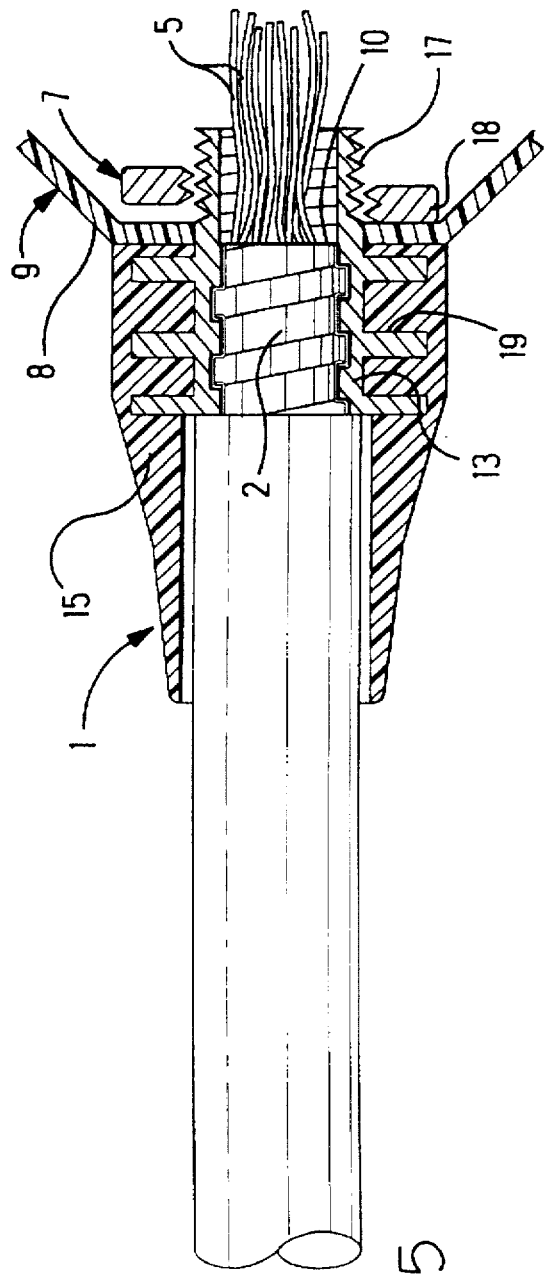

5,739,472

1

FLEXIBLE ARMOR CABLE ASSEMBLY

CROSS REFERENCE TO RELATED APPLICATION

This application is based on a provisional application Ser. No. 06/004,805, Filed Sep. 29, 1995, now abandoned.

FIELD OF THE INVENTION

The present invention relates to a flexible cable assembly suitable for connection to a hand held, medical instrument, and more particularly to a flexible cable assembly that is protected against crushing or penetration by a sharp implement.

BACKGROUND OF THE INVENTION

U.S. Pat. No. 4,761,519 discloses a flexible cable comprising, a bundle of multiple electrically insulated conductors, specifically made for medical use, such as coaxial cables, of flexible and limp construction. The flexible cable is suitable for connection to a hand held, medical instrument for monitoring human physiological indications during diagnostic and surgical procedures. As disclosed by the patent, braided wire shielding on the flexible cable is constructed in an advantageous manner to provide reduced resistance to movement of the cable in axial and rotational directions. The cable is constructed to reduce frictional resistance between the shielding and additional components of the cable construction.

When the flexible cable is present in a hospital environment, during a surgical procedure, the cable may come in contact with a sharp surgical instrument. At other times, in a hospital environment, the flexible cable can be subject to damage, for example, from impact when the cable dangles freely. The flexible cable can be damaged from crushing when the cable lies under a heavy object or when the cable is run over by wheeled vehicles. For a flexible cable that is suited for use in a hospital environment, something must be done to protect the cable from damage. It would be advantageous to construct the cable itself with a construction that would protect the cable from damage. The advantage gained would comprise, not only a prolonged life for the cable, but also an assurance that patient monitoring would be ready without a defective cable.

A requirement for a flexible cable that is protected from damage shall supplement further requirements for the cable. For example, the cable must be capable of connection to a hand held, medical instrument, which typically comprises, an electronic transducer that provides electronic signals as a measure of human body indications. The cable must remain flexible and limp to permit freedom of movement of the medical instrument as the instrument is hand held and maneuvered.

SUMMARY OF THE INVENTION

According to the invention, a flexible cable assembly that is protected from damage is capable of connection to a medical instrument, and remains flexible and limp to permit freedom of movement of the medical instrument as the instrument is hand held and maneuvered.

According to the invention, multiple coaxial cables of the cable assembly are protected by metal armor, the coaxial cables lie limply within the armor to assure flexibility of the cable assembly, the armor is enclosed in a flexible jacket, the armor lies limply within the jacket, an air gap between the armor and the jacket provides a space within which the

2 armor can shift during flexure of the cable to assure flexibility of the cable assembly.

One advantage of the cable assembly using the flexible armor, is that the armor protects the coaxial conductors from abrasion, crushing and breaking.

Another advantage of the cable assembly is that, internal strain on the cable assembly is borne by the armor, while the coaxial cables are freed from excessive strain during flexure of the cable assembly or when the cable assembly is pulled. Thus, the central conductors of the coaxial cables can be smaller in diameter or reduced in tensile strength, as compared to previous cable assemblies wherein an armor was absent. Due to the improved limpness of the cable assembly, more ductile copper can be used in place of expensive copper alloys of improved tensile strength.

One of the embodiments consists entirely of coaxial cables, and this embodiment will be referred to hereafter.

According to an embodiment, multiple coaxial cables of the cable assembly are protected by metal armor, the coaxial cables lie limply within the armor to assure flexibility of the cable assembly, the armor is enclosed in a flexible jacket, the armor lies limply within the jacket, an air gap between the armor and the jacket provides a space within which the armor can shift during flexure of the cable to assure flexibility of the cable assembly.

Further according to an embodiment, a hollow coupling mechanism for connection to a medical instrument is secured to an end of the armor and an end of the jacket, with the coaxial cables extending through the coupling mechanism for connection to the medical instrument.

The embodiment further may comprise, a flexible and limp conductive shield encircling said portions of the cables, an exterior circumference of the shield being smaller than an interior circumference of the armor. An air gap exists in the dimensional distance between the circumferences of the shield and the armor. The air gap provides a space within which the shield can shift during flexure of the cable.

The embodiment further may comprise the coupling mechanism constructed with a rigid ring threaded onto an end of the armor that projects from an end of the jacket, and a boot covering both the rigid ring and the end of the jacket, and a seal established between the boot and the jacket.

the embodiment further may comprise, the coupling mechanism constructed with a clamping ring radially surrounding the rigid ring. The clamping ring is attached directly to the rigid ring, or is radially attached to the boot, thus to radially surround both the boot and the rigid ring that is radially beneath the boot.

An object of the invention is to provide armor protection for a flexible cable assembly that is capable of connection to a medical instrument, and that remains flexible and limp to permit freedom of movement of the medical instrument as the instrument is hand held and maneuvered.

Another object of the invention is to provide metal armor protection for a flexible cable assembly that absorbs internal strain when pulling on the cable assembly, or when the cable assembly undergoes flexure.

DESCRIPTION OF THE DRAWINGS

Embodiments of the invention will now be disclosed by way of example with reference to the accompanying drawings, according to which:

FIG. 4 is a side view with parts in section of another cable assembly including the structure shown in FIG. 1;

FIG. 5 is a side view with parts in section of another cable assembly including the structure shown in FIG. 1;

DETAILED DESCRIPTION

Figure 2:
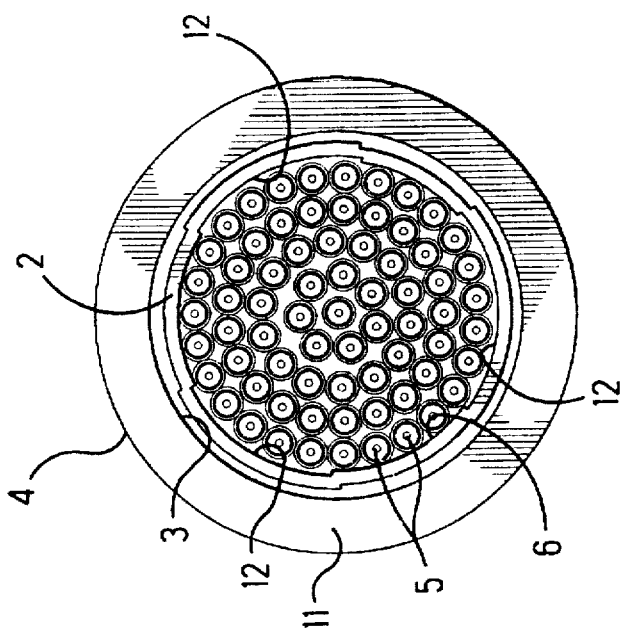
FIG. 2 is an end view of the portion of the structure shown in FIG. 1.

With reference to FIGS. 1–7, a flexible cable assembly 1 comprises, flexible hollow armor 2, FIGS. 1–3 and 6, lying limply within an air gap 3 in a flexible outer jacket 4, multiple coaxial cables 5 lying limply within an air gap 6 in the armor 2, a hollow coupling mechanism 7, FIGS. 3–5 and 7, for connection to a housing 8 of a medical instrument 9, shown in part, in FIGS. 4 and 5, the coupling mechanism 7 being secured to an end 10 of the armor 2 and an end 11 of the jacket 4, with the cables 5 extending through the coupling mechanism 7 for connection to the medical instrument 9 that is shown in part, in FIGS. 4 and 5.

Figure 1:
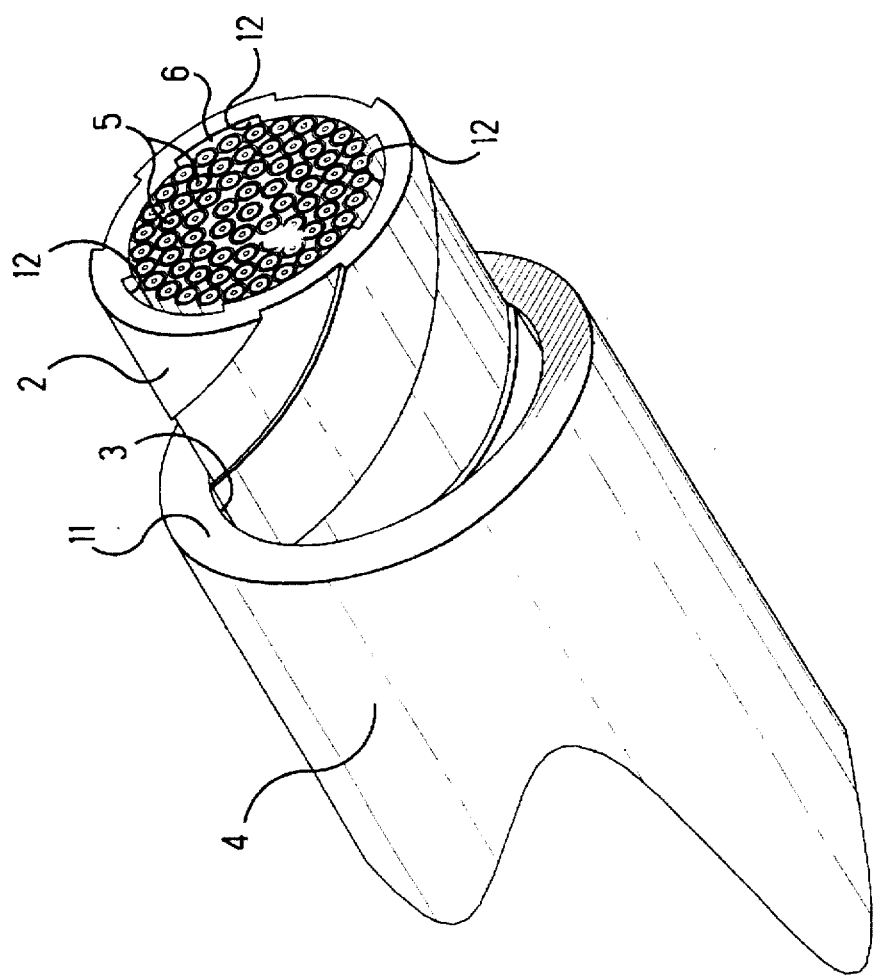
FIG. 1 is an isometric view of a portion of a cable assembly.
Figure 6:
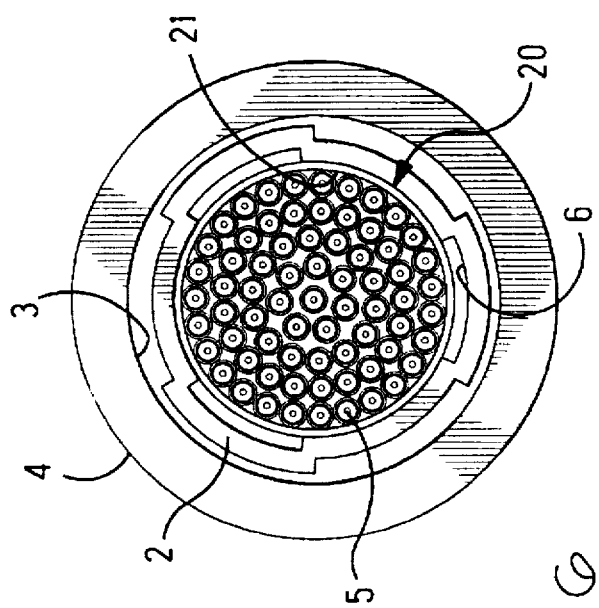
FIG. 6 is an end view of a portion of a cable assembly including a conductive shield.

With reference to FIGS. 1, 2 and 6, a core of the cable assembly 1 is constructed of the multiple coaxial cables 5. The multiple cables 5 are in a bundle, with each of the cables 5 lying straight within the bundle. The cables 5 are cylindrical in cross section, providing interstitial spaces between the cables 5 in the bundle. An exterior circumference of the bundle of cables 5 comprises, an exterior circumference that surrounds all of the cables 5 collectively in the bundle. Each coaxial cable 5 is flexible and limp, and is constructed with a conductive shield encircling concentrically a dielectric sheath, in turn, encircling a central conductor to provide a controlled electrical impedance. Each coaxial cable 5 is used to transmit electronic signals along the central conductor.

The construction of a bundle of coaxial cables 5 provides multiple coaxial cables 5 gathered into the bundle, wherein the coaxial cables 5 touch one another and are parallel to one another in the bundle, and further wherein the coaxial cables 5 extend straight, without coiling and without torsional skew. interstitial spaces between adjacent coaxial cables 5 in the bundle allow for lateral movement of the coaxial cables 5 relative to one another, particularly when the bundle of cables 5 undergoes flexure. This construction allows flexure of the bundle in an arc, while the individual coaxial cables 5 in the bundle are free to flex in respective bend radii. During flexure of the bundle of coaxial cables 5 along an arc, the coaxial cables 5 will shift with respect to one another, as each coaxial cable 5 flexes along its own, individual bend radius.

The exterior circumference of the bundle of cables 5 is smaller than an interior circumference of the armor 2. Then air gap 6 exists in the dimensional distance between the circumferences of the bundle of cables 5 and the armor 2. The air gap 6 provides a space within which the cables 5 can shift laterally within the interior of the armor 2 during flexure of the cable assembly 1. Advantageously, a flexible and limp cable assembly 1 results, with a reduced resistance to movement of the cable assembly.

The armor 2 is manufactured of any of a variety of metals, including aluminum, copper, brass, and stainless steel. The armor 2 is a composite construction of interlocking hollow links that comprise adjacent interlocking helices. According to U.S. Pat. No. 2,290,423, the armor 2 has been used, in the past, to terminate to a telephone housing and to a telephone handset. According to U.S. Pat. No. 5,350,885, the armor 2 has been used to terminate to a metal terminal box. The armor 2 is commercially available, either uncovered or, alternatively, covered by an extruded sheath of insulating material, not shown, that tightly surrounds the armor 2. It has been found that the tightly covered armor 2 is unsuitable for the present invention, due to increased stiffness of a tightly covered armor 2 as compared with a reduced stiffness of an uncovered armor 2.

For example, the uncovered armor 2 is constructed with helices defining open channels 12 in the wall of the armor. Each of the channels 12 extends helically, such that corresponding coaxial cables 5 inside the armor 2 will bridge across each of the channels 12 without falling into any of the channels 12. During flexure of the bundle of coaxial cables 5 along an arc, the coaxial cables 5 will shift with respect to one another, as each coaxial cable 5 flexes along its own, individual bend radius. The coaxial cables 5, although confined within the armor 2, are free to flex individually along their own bend radii, which causes the bundle of the cables 5 to flex and expand within the air gap 6 in the interior of the armor 2. The coaxial cables 5 are free to move toward and way from the interior of the armor 2. The coaxial cables 5 that extend along an exterior of the bundle are free to touch the interior of the armor 2. Accordingly, the armor 2 encircles the coaxial cables 5 without restricting compound movement of the coaxial cables 5 within the jacket 4. The armor 2 has opposite ends 10, with one of the ends 10 being shown in FIGS. 3, 4, 5 and 7. Each end 10 of the armor 2 is deburred and blunted, for example, by grinding or filing, to eliminate a sharp edge that could damage the coaxial cables 5.

With reference to FIGS. 1–3 and 6, the jacket 4 is constructed as an extrusion of a thin wall tube of plastic material, for example, polyvinylchloride, PVC. The jacket 4 has an interior circumference that is larger than an exterior circumference of the armor 2. Accordingly, the interior air gap 3 is provided between an interior circumference of the jacket 4 and the exterior circumference of the armor 2. The jacket 4 is manufactured separately from the armor 2. The jacket 4 is smooth, and is insulating. Thereby, the rough conductive surface of the armor 2 is covered and is prevented from causing abrasion damage and electrical shock.

An exterior circumference of the armor 2 is smaller than an interior circumference of the jacket 4. The air gap 3 exists in the dimensional distance between the circumferences of the armor 2 and the jacket 4. The armor 2 lies loosely and limply within the jacket 4. The air gap 3 provides a space within which the armor 2 can shift laterally within the interior of the jacket 4 during flexure of the cable assembly 1. Further, for example, during flexure of the cable assembly 1, the armor 2 will move within the interior of the jacket 4, with the armor 2 bending along its own individual bend radius. The armor 2 touches the jacket 4 at some place along the length of the jacket 4.

For example, a cable can be constructed that comprises, seventy coaxial cables 5, each fabricated with 38 AWG 7/48 SP Duraflex 5 Polytetrafluoroethylene, of 0.009 nominal wall thickness, a 48 AWG TC copper alloy that is braided to form a served shield of 95% minimum coverage, and covered with 0.008 nominal wall thickness of polytetrafluoroethylene. Each cable 5 is of 50 Ohms impedance. The seventy cables 5 are inserted along the hollow armor 2, the armor 2 being commercially available. The outer jacket 4 is a tube of Polyvinylchloride having a 0.035 nominal wall thickness, with an outside diameter of 0.400. All dimensions are in inches.

The hollow coupling mechanism 7 is attached to one end of the cable assembly 1, as disclosed in the drawing figures. It should be understood that a coupling mechanism 7 can be attached at either end of the cable assembly 1. Each coupling mechanism 7 comprises, an internally threaded, rigid nut 13 that is threadably driven over the corresponding end 10 of the armor 2. The helical construction of the armor 2 provides the pitch angle for the internal threads of the nut 13. The jacket 4 is cut to a desired length. The jacket 4 covers the armor 2 and extends between the nuts 13 that are on the two opposite ends 10 of the armor 2. The nuts 13 and the jacket 4 serially cover the armor 2, with the nuts 13 abutting opposite ends 11 of the jacket 4.

It is desirable to provide slack in the armor 2, such that the armor 2 will lie limply within the air gap 3 within the jacket 4. The amount of slack in the armor 2 is adjusted by threadably moving one of the nuts 13 along the armor 2 until a gap, not shown, exists between the nut 13 and a corresponding end 11 of the jacket 4. The armor 2 is then allowed to slacken and lie limply within the jacket 4, which will close the gap, and transport the nut 13 toward and against the corresponding end 11 of the jacket 4. Such an adjustment of the nut 13 on one end of the armor 2 will lengthen or shorten the length of the armor 2 that extends between the nuts 13.

The length of the armor 2 that extends between the two nuts 13 is selected, by threaded movement of the nut 13 on one end of the armor 2, to a different position on the armor 2. The length of the armor 2 can be selected to be free of slack. The length of the armor 2 can be selected alternatively to be slightly longer than the slightly shorter jacket 4. When the slightly longer armor 2 is straight, rather than being slack, the nut 13 will move away from a corresponding end 11 of the jacket 4. Thereby, a gap, not shown, will exist between the slightly shorter jacket 4 and the nut 13 on the one end of the slightly longer armor 2. The slightly longer armor 2 is then slackened, such that a slack armor 2 will lie limply within the jacket 4. The amount of slack in the armor 2 will be determined by the length of movement of the transported nut 13 toward and against the corresponding end 11 of the jacket 4.

Figure 3:
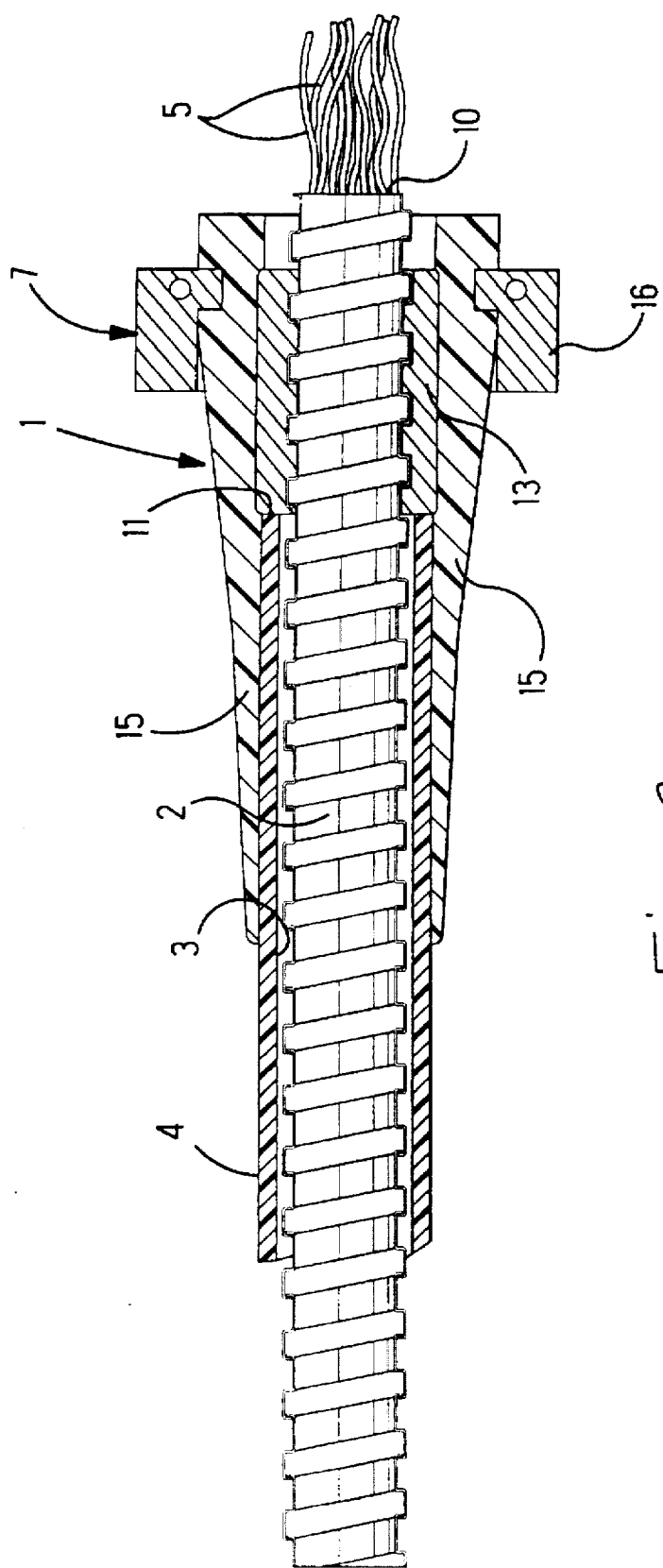
FIG. 3 is a side view with parts in section of a cable assembly including the structure shown in FIG. 1.

With reference to FIGS. 3, 4 and 5, each coupling mechanism 7 further comprises, a hollow, tubular boot 15 that provides a bending strain relief. An exterior of the boot 15 is tapered to enhance flexure of the boot 15 into an arc. The boot 15 is assembled concentrically to encircle portions of both the jacket 4 and the nut 13. Adhesive, in a thin layer, within the boot 15 seals and secures the boot 15 concentrically over the portions of the jacket 4 and the nut 13. Thus the nut 13 and the jacket 4 are secured to the boot 15 while abutting one another. The armor 2 is assured to remain in a slack condition within the jacket 4.

The coupling mechanism 7 is adapted to connect the cable assembly 1 to the medical instrument 9, for example, a hand held medical instrument 9, which typically comprises, an electronic transducer that provides electronic signals as a measure of human body indications. The cable assembly 1 must remain flexible and limp to permit freedom of movement of the medical instrument 9 as the instrument 9 is hand held and maneuvered. For example, the coupling mechanism 7 comprises, an exterior adjustable ring clamp 16, FIGS. 3 and 7, that is applied concentrically over the boot 15 and the nut 13. The nut 13 concentrically within the ring clamp 16 prevents collapse of the armor 2 when the ring clamp 16 is tightened to clamp the boot 15. The ring clamp 16 will clamp the housing 8 of the medical instrument 9 to the coupling mechanism 7. The bundle of coaxial cables 5 can be inserted along the armor 2 during any step in the process of fabricating the cable assembly 1, after the armor 2 has been cut to length and deburred and blunted.

Figure 7:
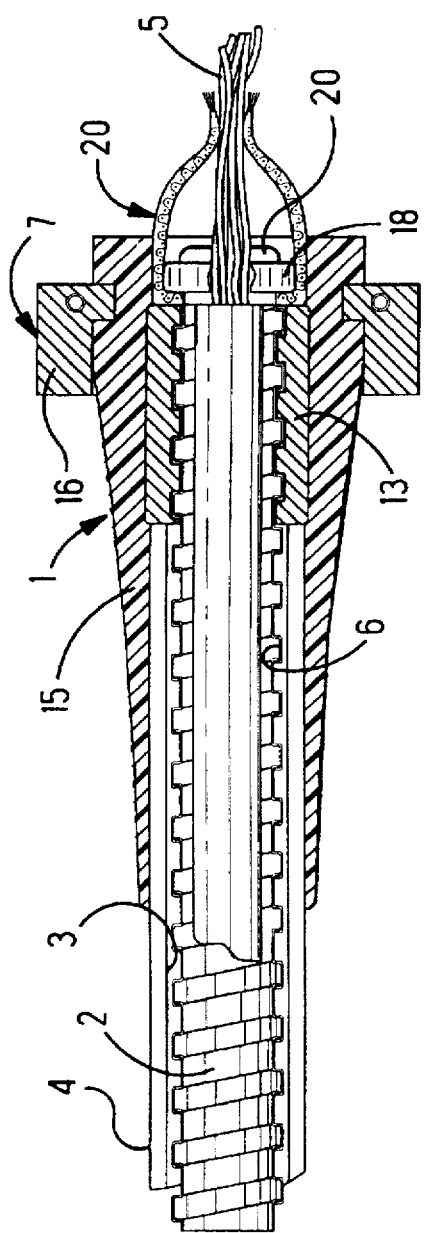
FIG. 7 is a side view with parts in section of a cable assembly including the structure shown in FIG. 6.

With reference to FIGS. 4 and 5, the coupling mechanism 7 comprises, an externally threaded end 17 on the nut 13 that projects outwardly of the boot 15. The housing 8 of the hand held medical instrument 9 is received concentrically over the threaded end 17 on the nut 13. An internally threaded lock nut 18 is threaded onto the threaded end 17 of the nut 13 to secure the cable assembly 1 to the medical instrument 9. In FIG. 7, the lock nut 18 is threaded on the end of the armor 2.

With reference to FIG. 5, the coupling mechanism 7 comprises, a series of radially projecting, exterior ribs 19 on the nut 13. The ribs 19 engage an interior of the boot 15 to assure that the boot 15 is anchored in position. For example, the boot 15 can be molded in situ, onto the ribs 19 and onto the jacket 4 to seal and attach the boot 15 onto the nut 13 and the jacket 4.

The coaxial cables 5 are longer than the armor 2 and the jacket 4, and project through the hollow coupling 7 at each end of the cable assembly 1 for connection to a remainder, not shown, of the medical instrument 9; for example, opposite ends of the coaxial cables 5 are free to be connected electrically to respective electrical contacts, not shown, which can have many different embodiments, for example, electrical contacts of an electrical connector, as described in U.S. Pat. No. 5,274,917, or, for example, pin type contacts, as described in U.S. Pat. No. 5,004,438. In turn, the respective electrical contacts will connect with electrical portions, not shown, of the medical instrument 9.

The armor 2, the jacket 4 and the lengths of the coaxial cables 5 inside the armor 2 undergo flexure. During such flexure, the coaxial cables 5 will move within the interior of the armor 2, with some of the cables 5 being allowed to touch the armor 2 at some place along the armor 2, and the armor 2 will move within the interior of the jacket 4, with the armor 2 being allowed to touch the jacket 4 at some place along the jacket 4.

With reference to FIGS. 6 and 7, the cable assembly 1 further comprises, alternatively, a hollow conductive and flexible shield 20 constructed as disclosed in U.S. Pat. No. 4,761,519. The shield 20 is a conductive and dense braid, and is self supporting. The bundle of coaxial cables 5 is inserted lengthwise inside the shield 20, with the coaxial cables 5 extending straight without coiling and without torsional skew. The straight cables 5 promote limpness of the cable assembly 1 by eliminating stiffness due to coiling or torsional skew in the coaxial cables 5. Additionally, a space 21 is between the shield 20 and the bundle of coaxial cables 5. The space 21 permits movement of the coaxial cables 5 within the shield 20 to promote flexibility. The shield 20 and the portions of the coaxial cables 5 being encircled by the shield 20 lie limply in the air gap 6 in the armor 2. The shield 20 is free to move toward and away from the armor 2, and is free to touch the armor 2. In FIG. 7, the lock nut 18 is threaded over a portion of the shield 20 that projects from the open end of the armor 2, which portion of the shield 20 is doubled back on itself concentrically to cover the armor 2.

One advantage of the cable assembly 1 using the flexible armor 2, is that the armor 2 protects the conductors of the coaxial cables 5 from abrasion, crushing and breaking.

Another advantage of the cable assembly 1 is that, internal strain on the cable assembly 1 is borne by the armor 2, while the coaxial cables 5 are freed from excessive strain during flexure of the cable assembly 1 or when the cable assembly 1 is pulled.

Another advantage of the cable assembly 1 is that, internal strain on the cable assembly 1 is borne by the armor 2, while the coaxial cables 5 are freed from excessive strain. Thus, the central conductors of the coaxial cables 5 can be smaller in diameter or reduced in tensile strength, as compared to previous cable assemblies wherein an armor 2 was absent. For example, wire of silver plated copper, SPC, of solid gauge can be used as a less costly alternative to the use of conductors fabricated from higher strength copper alloys, and conductors fabricated of multiple strands instead of a single solid strand.

Other embodiments and modifications of the invention are intended to be covered by the spirit and scope of the appended claims.

We claim:

1. A flexible cable assembly comprising:

flexible hollow armor of a cable, said armor lying limply within an air gap in a flexible length of an outer jacket of said cable, multiple coaxial cables lying limply within an air gap in said armor, a coupling mechanism for connection to a medical instrument, the coupling mechanism being secured to one end of the said armor and one end of said length of the outer jacket, with the coaxial cables extending through the coupling mechanism for connection to the medical instrument, said one end of said hollow armor and an opposite end of said armor being terminated, respectively, with strain relief boots, said one end of said length of the outer jacket and an opposite end of said length of the outer jacket being terminated, respectively, with said strain relief boots, and opposite ends of said cable being terminated, respectively, with said strain relief boots.

2. A flexible cable assembly comprising:

multiple coaxial cables lying limply within an air gap in a hollow, flexible length of armor, said armor protecting the coaxial cables from abrasion, crushing and breaking, said armor lying limply within an air gap in a flexible length of the outer jacket, said armor being longer than said flexible length of the outer jacket, and a coupling mechanism, a nut of the coupling mechanism being attached to said armor, and a strain relief boot of the coupling mechanism being sealed to the nut and to said flexible length of the outer jacket.

3. A cable assembly as recited in claim 2 wherein, the nut of the coupling mechanism engages an end of said flexible length of an outer jacket.

4. A cable assembly as recited in claim 2, and further comprising: a housing of a medical instrument received over said nut, and a lock nut on said nut securing the housing to said nut.

5. A cable assembly as recited in claim 2, and further comprising: the boot being secured by adhesive to said nut and to said flexible length of the outer jacket.

6. A cable assembly as recited in claim 2, and further comprising: exterior ribs on said nut engaging the boot.

7. A cable assembly as recited in claim 2, and further comprising: the boot being molded in situ to attach the boot onto said nut and onto said flexible length of the outer jacket.

8. A cable assembly as recited in claim 2, and further comprising: a ring clamp concentrically over the boot and said nut, and said ring clamp clamping a housing of a medical instrument to the coupling mechanism.

9. A cable assembly as recited in claim 2, and further comprising: a hollow and conductive flexible shield encircling the coaxial cables, said shield lying limply within said armor, and a lock nut on said nut securing said shield to said nut.

* * * * *